Figure 1:
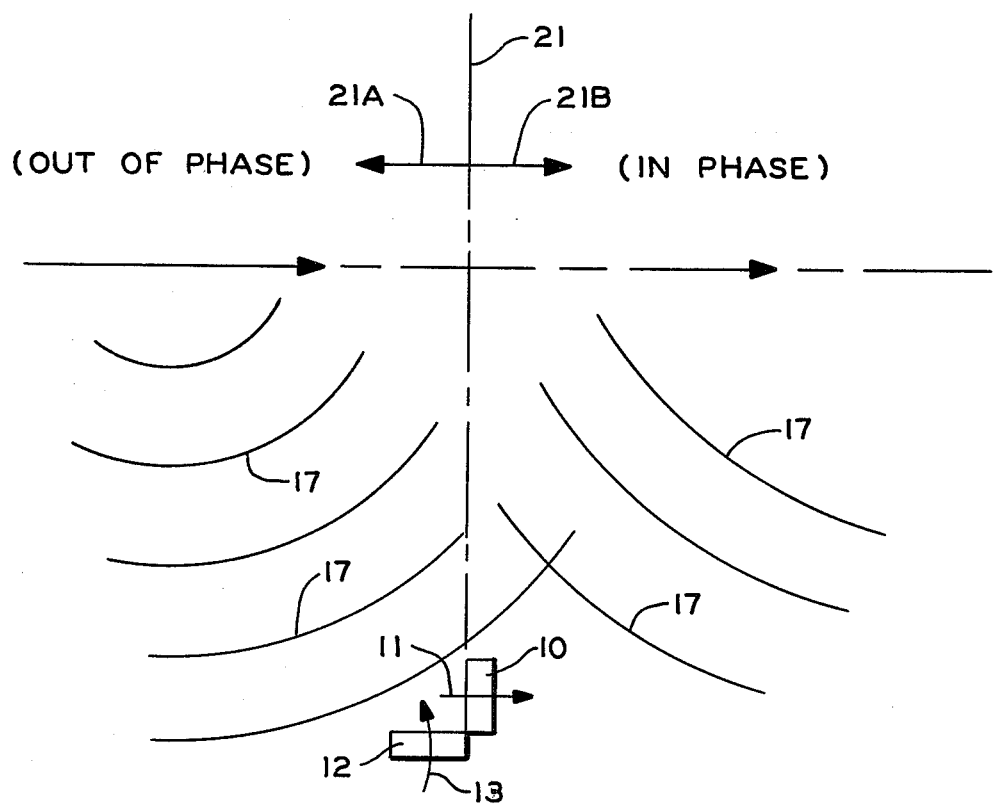

United States Patent [19]

Van Sloun

[11] 4,279,027
[45] Jul. 14, 1981

[54] ACOUSTIC SENSOR

[75] Inventor: Peter H. Van Sloun, Hopkins, Minn.

[73] Assignee: Honeywell Inc., Minneapolis, Minn.

[21] Appl. No.: 75,346

[22] Filed: Sep. 13, 1979

[51] Int. Cl.³ .............................................. G01S 3/80
[52] U.S. Cl. .................................... 367/125; 367/117
[58] Field of Search ............... 367/117, 125, 129, 133, 367/135, 136; 102/18 R, 211

[56] References Cited

U.S. PATENT DOCUMENTS

| 2,966,657 | 12/1960 | Price | 367/129 |
| 3,348,195 | 10/1967 | Spandöck | 367/125 |
| 4,189,999 | 2/1980 | Anderson | 102/18 R |

Primary Examiner—Richard A. Farley
Attorney, Agent, or Firm—Roger W. Jensen

[57] ABSTRACT

Apparatus for locating an acoustic source which includes a pair of gradient microphones each of which is adapted to receive an acoustic wave on one axis with the two axes of the microphones being orthogonal to one another. Processing means are included for receiving first and second signals from the two gradient microphones in comparing the phase of the two signals, whereby alarm means are provided for producing a signal identifying a change in state of the phase comparison. Upon the change in state of the phase comparison, from either mutually in phase or mutually out of phase with one another, the point of closest proximity to the sensor is determined.

5 Claims, 2 Drawing Figures

ACOUSTIC SENSOR

BACKGROUND OF THE INVENTION

Acoustic sensors which employ microphones and which are used to determine direction of an acoustic wave source have been proposed for many applications, both in the military and commercial areas. One such system is an acoustic direction finder disclosed in U.S. Pat. No. 2,966,657 wherein the particular application of the apparatus is employed for locating the origin of sound waves due to gun fire and other similar soundwave generating sources. Microphones or "cosine law" microphones are disclosed in an arrangement where signals of opposite polarity are produced when the signals are received from opposite directions in combination with an omnidirectional third microphone. Circuitry is provided to permit the determination of the arrival direction of sound waves through the processing of these three microphones.

In U.S. Pat. No. 2,459,162, acoustic apparatus is disclosed for determination of the direction of a sound wave source. A receiver is mounted on a rotatable shaft which then is employed in combination with a reflector such that there is a visual means controllable by the receiver and the reflector for indicating the direction of compressional or sound waves.

U.S. Pat. No. 3,854,117 discloses a passive system employing two or more microphones in a direction finding scheme. A phase difference detector is provided to receive first and second versions of two different sources of a common input signal to give a non-linear output indicating the phase differences. The reference clearly does not comprehend measurement of the closest point of approach since it is strictly designed to locate the direction of a sound source.

While all of the above-described systems are particularly complicated by the attention given to determining the precise angular location of the acoustic source with respect to the sensor it would be of substantial advantage to the art if a simpler sensor system could be provided which would determine the point in time when a source of acoustic energy is closest to the sensor. In the traffic control industry, it is often desireable to employ sensors which will cause traffic light signals or other traffic control means to operate in advance of the arrival of the vehicle at the point of control. By properly positioning a sensor so that the nearest point from a path of travel to the sensor is at a predetermined location in advance of the control area, detection of a vehicle which thus produces acoustic waves at this point will permit a signal to be passed to the point of control for operation by that means. Similarly, in the control of air traffic at airports, such as major airfields where a number of planes are taxiing simultaneously, it is often times appropriate to determine the location of certain taxiing vehicles so as to advise other traffic for coordinated operation of the runways. Automated control could be employed which would be activated by receipt of a signal from a sensor which could determine the passage of a particular sound generating taxiing airplane past the closest proximity to a given point.

Accordingly, it is an object of this invention to provide a sensor which is capable of determining the path of a moving source of acoustic energy to the extent that a real time determination of the closest approach point to the sensor by the vehicle is determined. Other objects will appear hereinafter.

THE INVENTION

It has now been discovered that a new improved acoustic sensor can be provided which is capable of determining the point in time at which a moving source of acoustic energy passes closest to that sensor. Specifically, a sensor has been discovered which includes a pair of gradient microphones adapted to receive acoustic waves in first and second axes respectively, transmitting a signal from each of the microphones, such that the second axis is orthogonal to the first axis. Signal processing means are provided for receiving first and second signals from the two gradient microphones and comparing the phase of the two signals. Alarm means are then provided for producing a signal identifying a change in the state of the phase comparison.

In a preferred embodiment, the signal processing means includes amplifier means for increasing the signal strength of both signals coming from the gradient microphones. Furthermore, band pass amplifier means can be employed which will reject signals from an unwanted frequency, passing only those signals which are predetermined to be of interest to the sensor. To further eliminate undesirable sensing signals, threshold means can be provided for producing an output only when the signal exceeds a predetermined amplitude or other predetermined characteristic of the signal generated by the microphone. In a preferred embodiment, the threshold means include positive signal means for producing a positive signal when the first or second signal is above a predetermined amplitude and negative signal means for producing a negative signal when the first or second signal is below a predetermined amplitude. Further included in this preferred embodiment is a in-phase comparitor means for generating a signal when the first and second signals are in phase, and an out-of-phase comparitor means for generating a different signal when the first and second signals are out of phase with respect to one another. Finally, the alarm means is preferably adapted to contain means for detecting a change in the signals received from either the in-phase comparitor or the out-of-phase comparitor so that a change from one to the other is readily detected.

Figure 2:
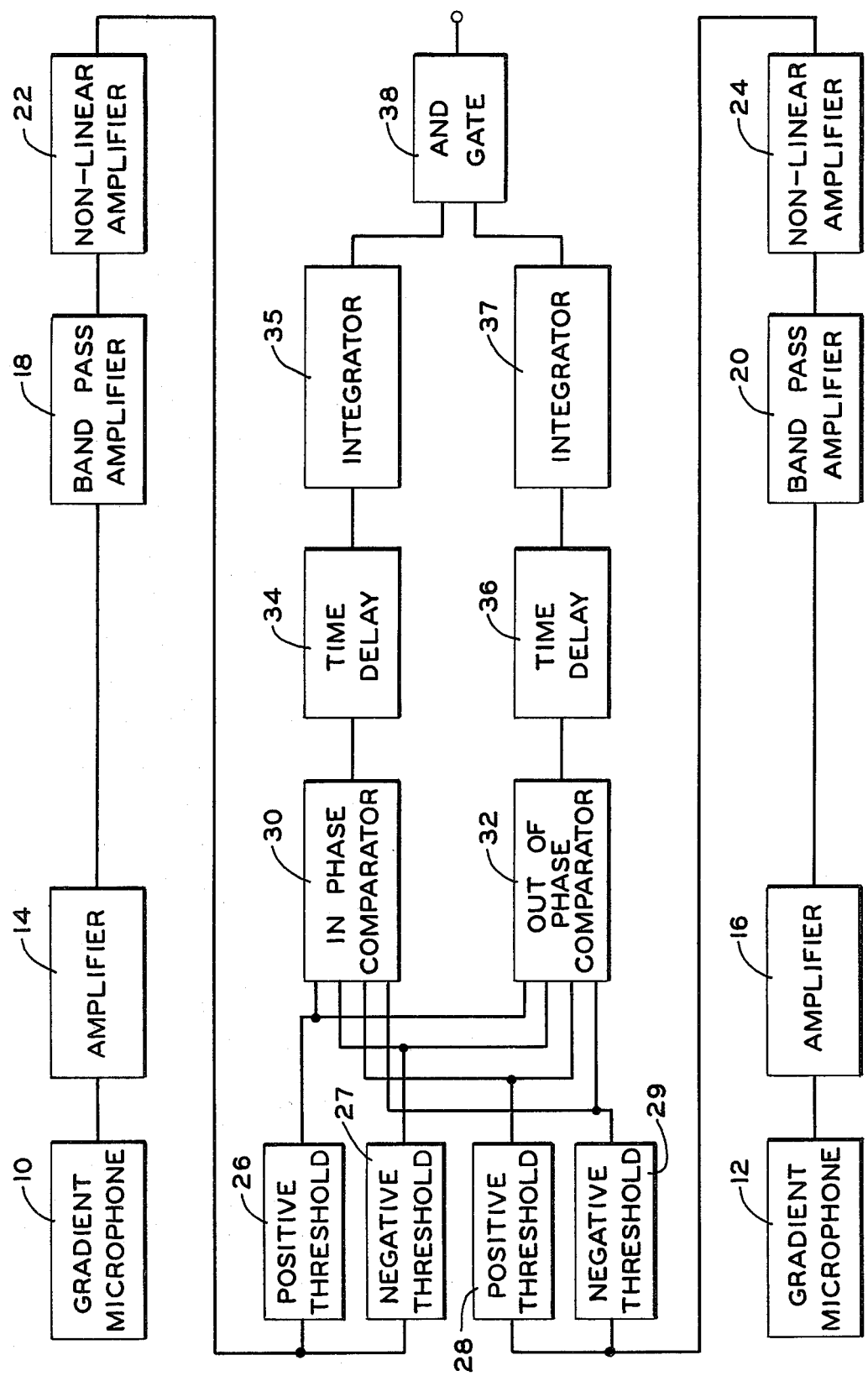

For a more complete understanding of the invention, reference is hereby made to the drawings, in which:

FIG. 1 represents a schematic view showing deployment of the microphones of the present invention, and FIG. 2 shows a schematic view of a preferred embodiment of the present invention.

As shown in FIG. 1, a pair of gradient microphones 10 and 12 are deployed such that the operational axis of each of the two microphones is orthogonal to the other. Each microphone is adapted to receive acoustic waves in an axis and thereupon transmit a signal corresponding to the acoustic wave 17 which impinges upon each of the microphones 10 and 12. Gradient microphones are employed which have a spacial response following the cosine law. Arrows 11 and 13 indicate the direction of sensitivity such that sound waves impinging upon the heads of arrows 11 and 13 will be in phase while sound waves impinging upon the head of one and the tail of the other arrow indicate out-of-phase reception by the microphones. Similarly, sound waves striking both tails of the microphone 10 and 12 as illustrated by arrows 11 and 13 will appear to be in phase.

As shown in FIG. 1, the microphones 10 and 12 are oriented such that sound waves 17 following the vehicle path from left to right will impinge upon the tail of microphone 10 and the head of microphone 12, as illustrated by arrows 11 and 13, indicating an out-of-phase condition. Thus, any movement of the sound generating vehicle on the 21A side of axis 21 will indicate an out-of-phase condition. Similarly, as the vehicle passes across axis 21 into area 21B, sound waves 17 impinge upon the heads of both microphone arrows 11 and 13, indicating an in-phase condition. By appropriate signal generating means hereinafter described, the change of state from the 21A region to the 21B region as the acoustic waves generate signals in microphones 10 and 12 from an out-of-phase condition to an in-phase condition will cause generation of a change of state signal indicating that the closest point of passage has occurred.

Microphones 10 and 12, as illustrated in FIG. 1, are connected to circuitry in a preferred embodiment, such circuitry being shown in FIG. 2. Amplifiers 14 and 16 are provided to increase the microphone signal to a useable level. The bandpass amplifiers 18 and 20 encompass the vehicle frequencies of interest and increase the signal to noise ratio by rejecting unwanted signals of higher or lower frequencies. The nonlinear amplifiers 22 and 24 process small signals with a high gain and large signals with a low gain to provide a very large amplitude dynamic range. Positive threshold means 26 and 28 produce a digital output when the acoustic signal rises above the threshold. Negative threshold means 27 and 29 function similarly to produce a different digital output when the acoustic signal drops below the negative threshold.

The in-phase comparitor 30 produces an output when both positive thresholds 26 and 28 are generating a signal or when both negative threshold means 27 and 29 are generating a signal. Time delay 34 produces an output after approximately one-sixth the period of the highest frequency of interest. This time delay means prevents slight phase mismatches at the zero crossing area from being a nuisance. The signal is then forwarded to an integrator 35 which in a preferred embodiment has a short attack time constant and a long decay time constant such as for about 10 to 1. Thus a number of in-phase cycles are required to obtain an integrator output. The out-of-phase comparator processes similarly when one of the positive threshold means such as 26 is high in conjunction with the negative threshold means 29 of the other microphone. Again, the time delay and integrators 36 and 37 function as described above. An AND gate 38 is provided to produce an output when it receives both integrated outputs. The integrators are designed to provide an output which remains for a very short period after the in-phase signals or out-of-phase signals disappear. Thus, for a very short period of time both integrators 35 and 37 are producing a signal even though the source of the acoustic waves has changed from in-phase incident on microphones 10 and 12 to out-of-phase incident on microphones or the reverse. When both integrators 35 and 37 generate a signal, the AND gate 38 produces an output indicating that a change-in-state of the phase comparison is occurring. This change-in-state occurs when the vehicle is at the closest point to the sensor combination of microphones. It is obvious from an inspection of the circuit that a change from out-of-phase to in-phase is identical in terms of function at the AND gate to one where the change is from in-phase to out-of-phase.

Having determined that the sound generating source has approached the closest point to the sensor, further processing of the signal generated by the AND gate 38 can be accomplished in a conventional manner.

I claim:

1. Apparatus for locating an acoustic source, comprising:
   a first gradient microphone adapted to receive acoustic waves in the first axis and transmit a first signal corresponding to said wave;
   a second gradient microphone adapted to receive acoustic waves in a second axis and transmit a second signal corresponding to said wave, second axis being orthogonal to said first axis;
   signal processing means receiving said first and said second signals and comparing the phase of said signals, said signal processing means including positive signal means for producing a digital signal when said first or second signal is above a predetermined amplitude and a negative signal means for producing a different digital signal when said first or second signal is below a predetermined amplitude; and,
   alarm means for producing a signal identifying s change in state of the phase comparison.

2. The apparatus of claim 1 wherein said signal processing means includes amplifying means for increasing the signal strength of said first and second signals.

3. The apparatus of claim 1 wherein said signal processing means includes bandpass amplifier means for rejecting signals of an unwanted frequency.

4. The apparatus of claim 1 wherein said signal processing means includes in-phase comparator means for generating a signal when said first and second signals are in phase, and out-of-phase comparator means for generating a different signal when first and second signals are out of phase.

5. The apparatus of claim 4, which further includes means for detecting the generation of identical signals from said in-phase comparator means and said out-of-phase comparator means.

* * * * *